US012341617B2

(12) United States Patent
Hunukumbure

(10) Patent No.: US 12,341,617 B2
(45) Date of Patent: Jun. 24, 2025

(54) METHOD AND APPARATUS FOR IMPROVING HARQ IN A NON-TERRESTRIAL NETWORK

(71) Applicant: Samsung Electronics Co., Ltd., Suwon-si (KR)

(72) Inventor: Mythri Hunukumbure, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 17/629,968

(22) PCT Filed: Jun. 23, 2020

(86) PCT No.: PCT/KR2020/008098
§ 371 (c)(1),
(2) Date: Jan. 25, 2022

(87) PCT Pub. No.: WO2021/020735
PCT Pub. Date: Feb. 4, 2021

(65) Prior Publication Data
US 2022/0255673 A1    Aug. 11, 2022

(30) Foreign Application Priority Data

Jul. 26, 2019 (GB) ...................................... 1910721
Jun. 22, 2020 (KR) ........................ 10-2020-0075530

(51) Int. Cl.
*H04L 1/1867* (2023.01)
*H04B 17/318* (2015.01)
(Continued)

(52) U.S. Cl.
CPC ........... *H04L 1/189* (2013.01); *H04B 17/318* (2015.01); *H04L 1/0003* (2013.01);
(Continued)

(58) Field of Classification Search
CPC ... H04L 1/0003; H04L 1/0009; H04L 1/0016; H04L 1/0026; H04L 1/08; H04L 1/1812;
(Continued)

(56) References Cited

U.S. PATENT DOCUMENTS 11,589,315 B2 * 2/2023 Roy .................... H04W 52/146
2002/0150064 A1 10/2002 Lucidarme
(Continued)

FOREIGN PATENT DOCUMENTS

EP          1 750 408 A2    2/2007
WO       2017/057206 A1    4/2017

OTHER PUBLICATIONS

3GPP TR 38.811 V15.0.0 (Jun. 2018); Technical Report; 3rd Generation Partnership Project; Technical Specification Group Radio Access Network; Study on New Radio (NR) to support non terrestrial networks (Release 15) (Year: 2018).*

(Continued)

*Primary Examiner* — Omer S Mian
*Assistant Examiner* — Scott A Schlack
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). Disclosed is a method of operating a base station in a non-terrestrial network telecommunication system, comprising the steps of: the base station detecting a block fading condition in a communication channel; the base station determining an average spectral efficiency value and reporting this to a user equipment in communication with the base station; and the base station allocating a modulation and coding scheme and activating a pre-emptive HARQ operation wherein the pre-emptive HARQ operation comprises the steps of: the base
(Continued)

station determining an average fade duration; and sending multiple copies of a given data packet separated by a time at least equal to the average fade duration, with an MCS level matching a signal level associated with a non-fading condition of the communication channel.

7 Claims, 6 Drawing Sheets

(51) Int. Cl.
  *H04L 1/00* (2006.01)
  *H04W 84/06* (2009.01)
(52) U.S. Cl.
  CPC .......... *H04L 1/0009* (2013.01); *H04L 1/0013* (2013.01); *H04L 1/0026* (2013.01); *H04L 1/1896* (2013.01); *H04W 84/06* (2013.01)
(58) Field of Classification Search
  CPC ..... H04L 1/1816; H04L 1/1864; H04L 1/189; H04L 1/1896; H04L 5/0051; H04L 5/0057; H04B 17/318; H04B 17/373; H04B 17/3911; H04B 7/0632; H04B 7/18539; H04B 7/195; H04W 72/042; H04W 72/0473; H04W 72/10
  See application file for complete search history.

(56) References Cited

U.S. PATENT DOCUMENTS

| | | |
|---|---|---|
| 2006/0270360 A1 | 11/2006 | Han et al. |
| 2010/0246730 A1 | 9/2010 | Al-Naffouri et al. |
| 2011/0117915 A1 | 5/2011 | Chang |
| 2014/0112272 A1* | 4/2014 | Ro .................. H04L 1/1893 370/328 |
| 2015/0139000 A1 | 5/2015 | Matin et al. |
| 2020/0015099 A1* | 1/2020 | Futatsugi .............. H04W 40/12 |
| 2020/0059296 A1* | 2/2020 | Regunathan ....... H04B 7/18513 |
| 2020/0313795 A1* | 10/2020 | Xu ....................... H04L 1/1812 |
| 2021/0391952 A1* | 12/2021 | Hofström ............. H04L 1/1864 |
| 2022/0052756 A1* | 2/2022 | Choinière ............ H04W 28/16 |

OTHER PUBLICATIONS

ZTE, Discussion on the HARQ procedure for NTN, R1-1906873, 3GPP TSG RAN WG1 #97, May 13, 2019, Reno, USA.
European Search Report dated Jul. 29, 2022, issued in European Application No. 20847804.0.
László Csurgai-Horváth et al., Renewal Properties of Fade and Interfade Duration on Land Mobile Satellite Channel.
Samsung, HARQ procedure in NTN, 3GPP TSG RAN WG1 Meeting #97, R1-1906954, May 3, 2019, Reno, USA.
Mediatek Inc., Summary Delay-tolerant re-transmission mechanisms in NR-NTN Document for: Discussion and Decision, 3GPP TSG RAN WG1 Meeting #96bis, R1-1905733, Apr. 10, 2019, Xi'an, China.
GB Combined Search and Examination Report dated Dec. 5, 2019, issued in GB Application No. GB1910721.8.
International Search Report dated Oct. 12, 2020, issued in International Application No. PCT/KR2020/008098.

* cited by examiner

[Fig. 1]
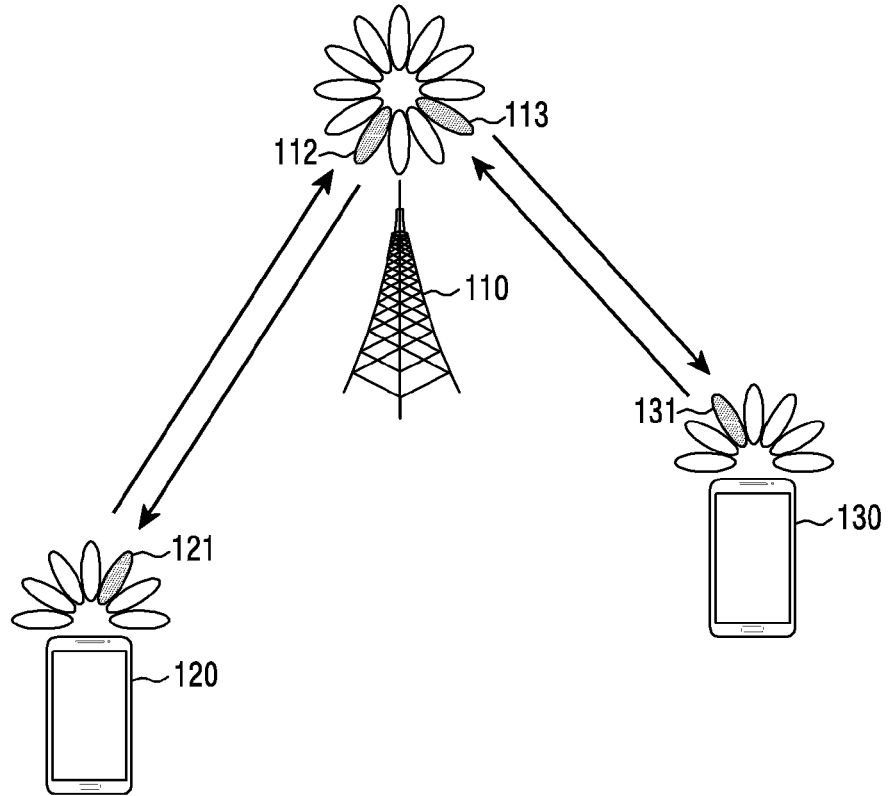
[Fig. 2]
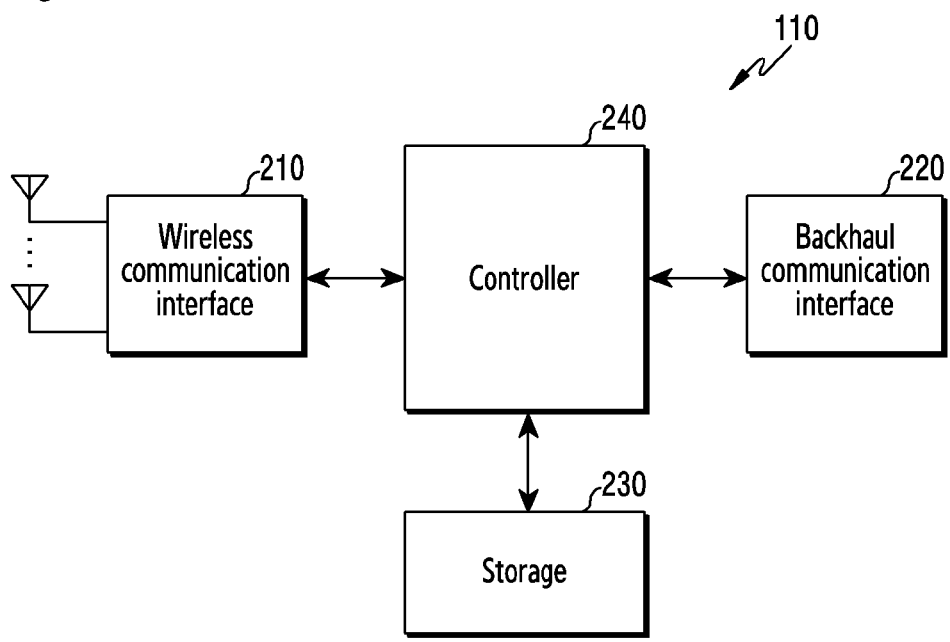

[Fig. 3]
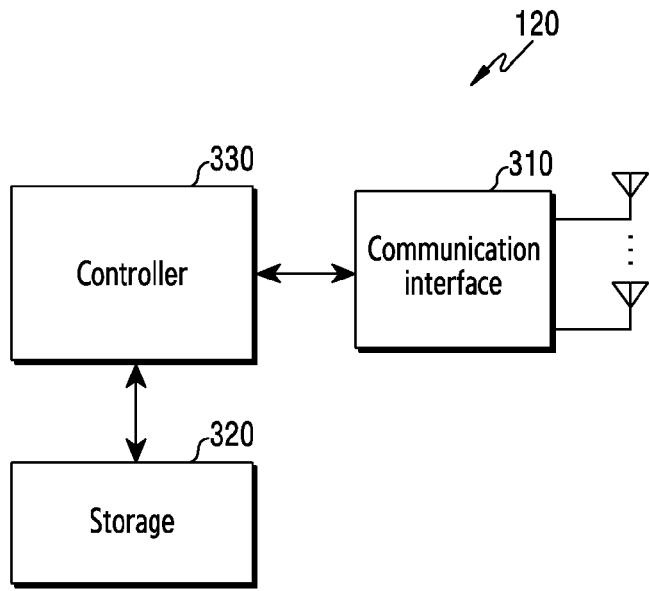
[Fig. 4]
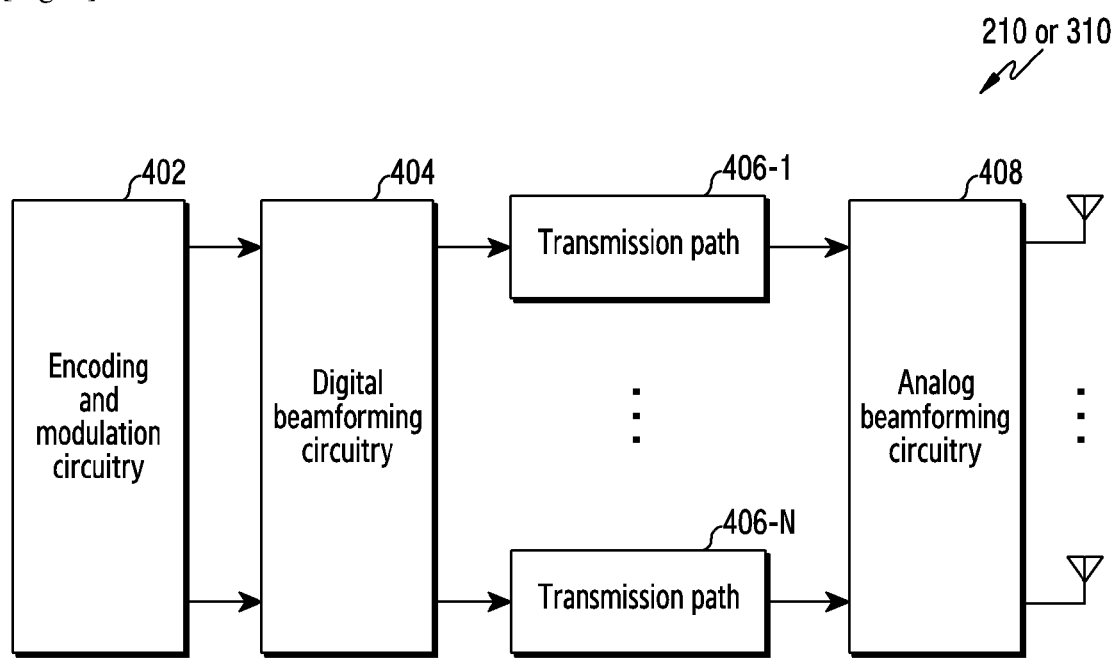

[Fig. 5]
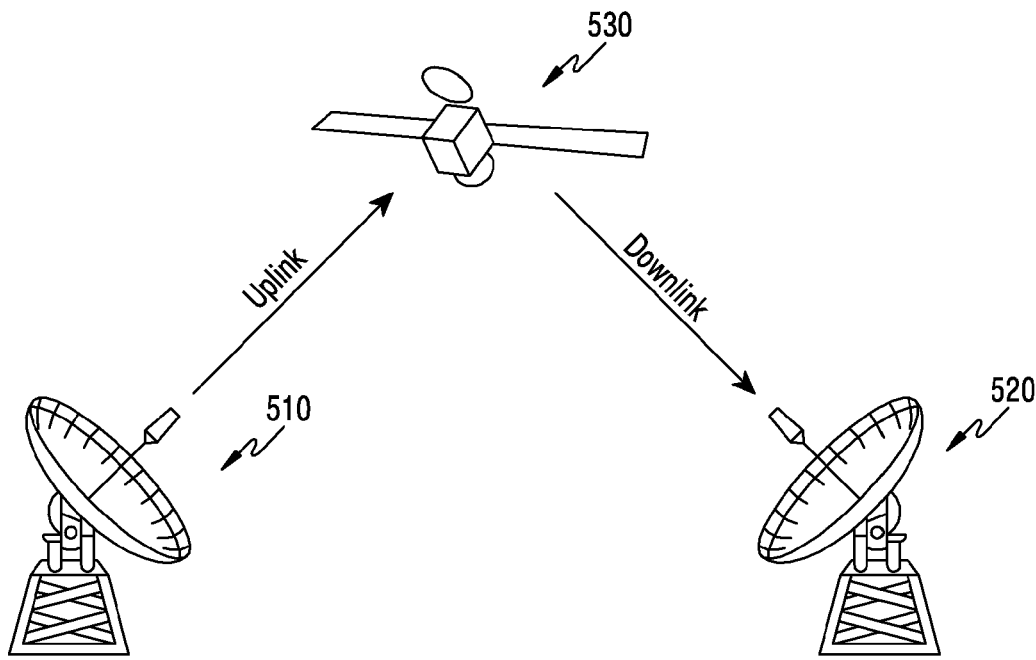
[Fig. 6]
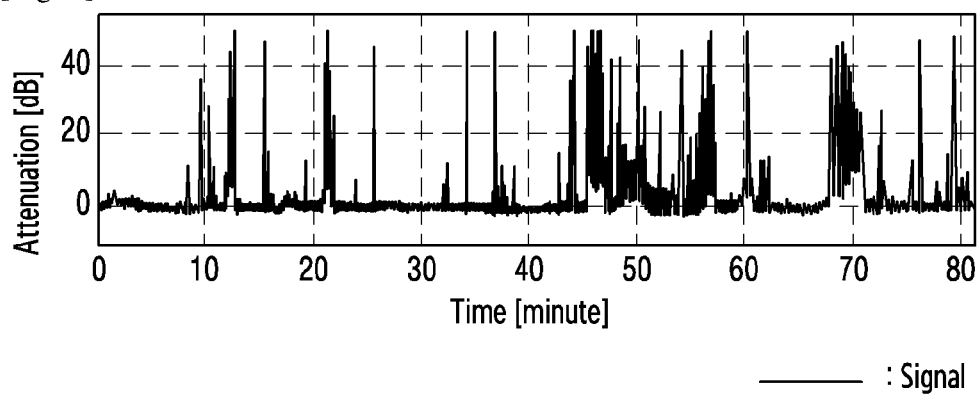
——— : Signal
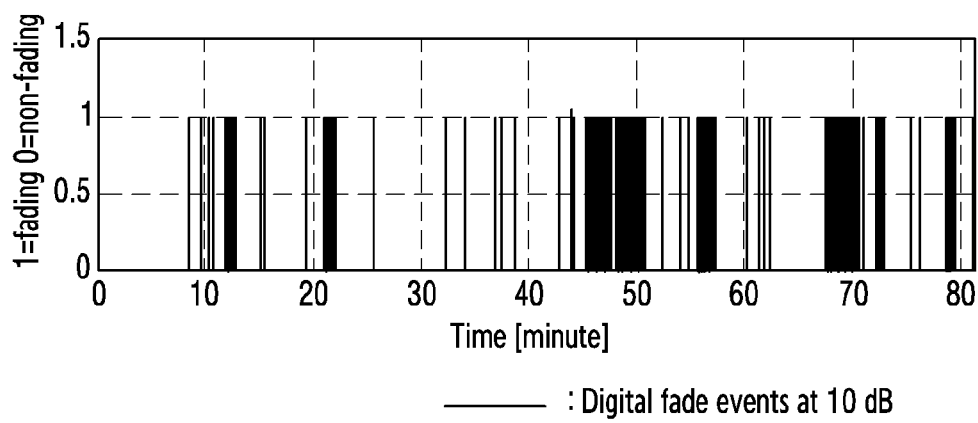
——— : Digital fade events at 10 dB

[Fig. 7]
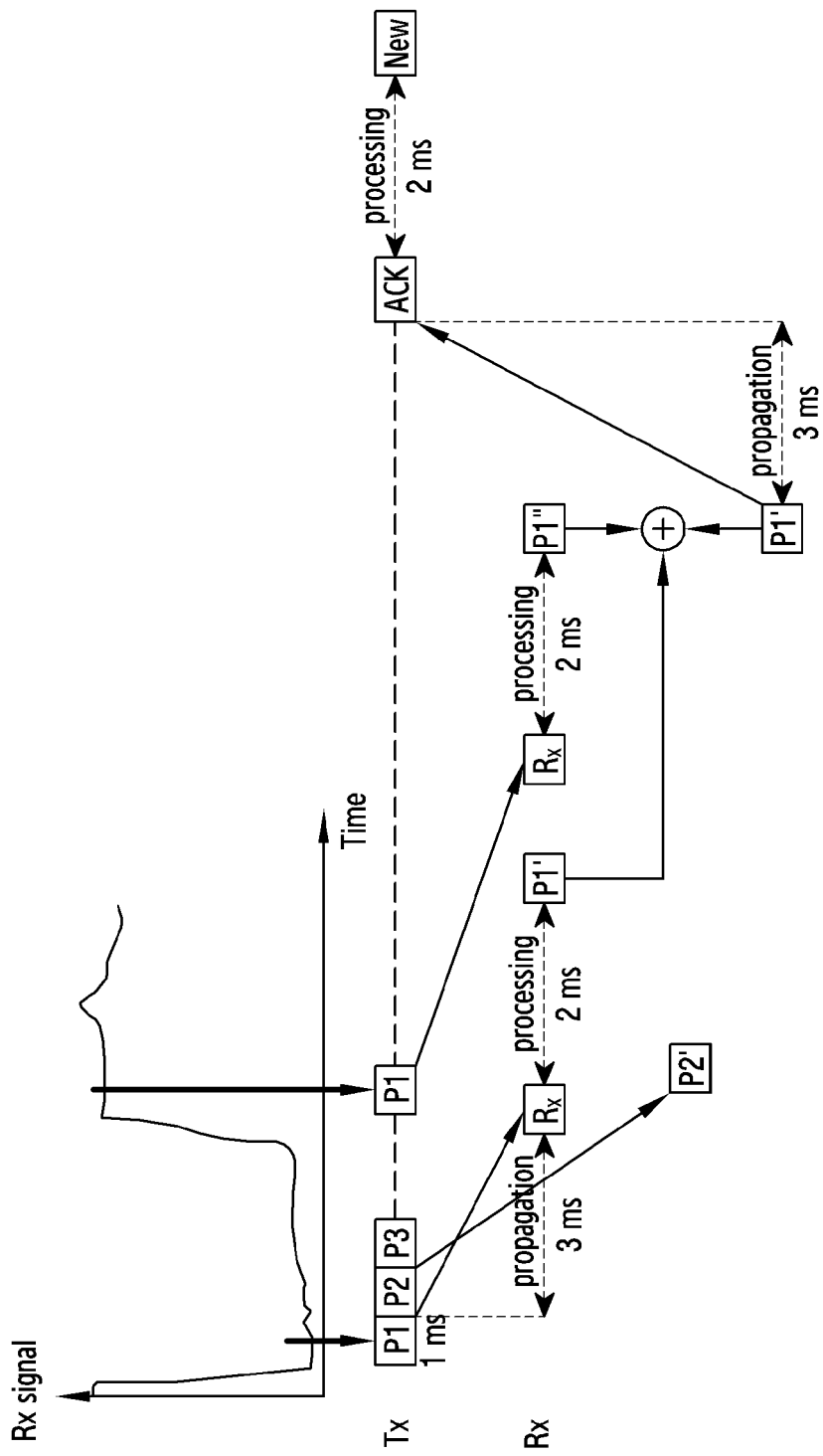

[Fig. 8A]
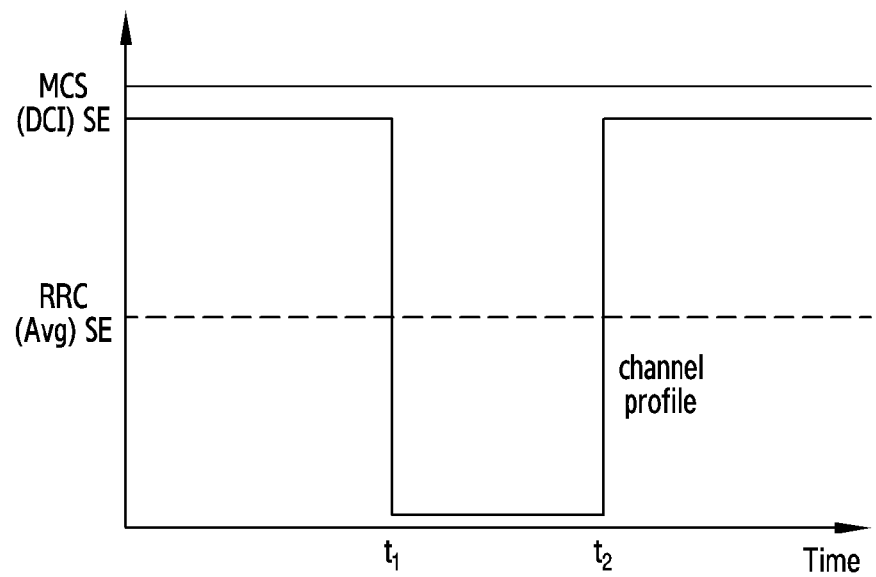
[Fig. 8B]
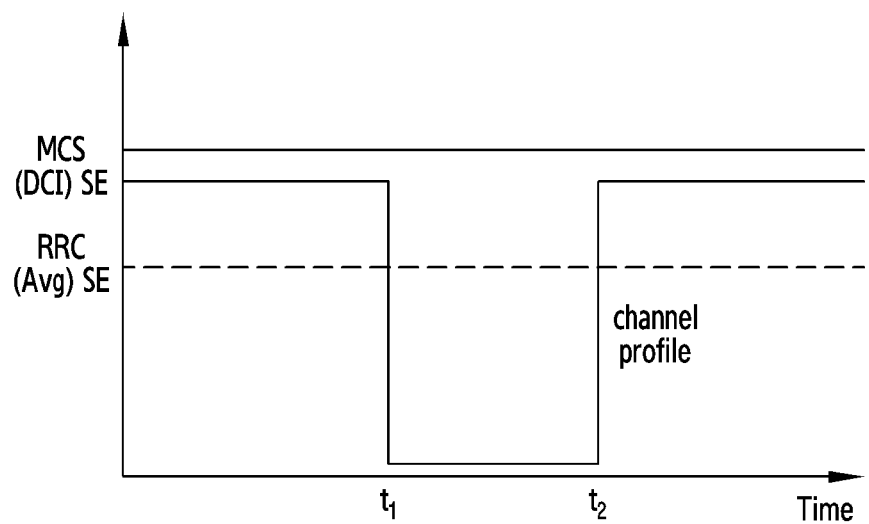

[Fig. 9]
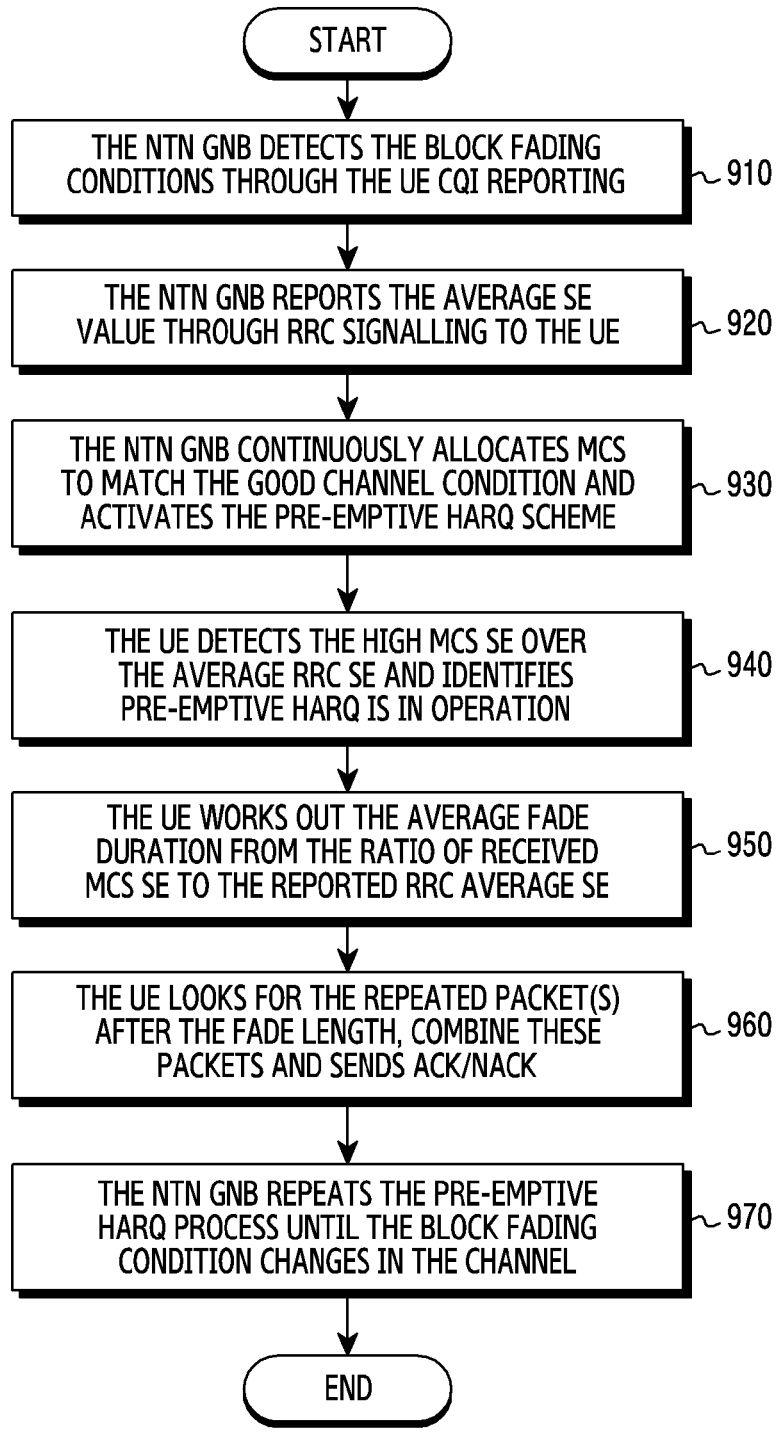

METHOD AND APPARATUS FOR IMPROVING HARQ IN A NON-TERRESTRIAL NETWORK

TECHNICAL FIELD

The present disclosure generally relates to a wireless communication system, more specifically relates to hybrid automatic repeat request (hybrid ARQ or HARQ) in a non-terrestrial network (NTN).

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

DISCLOSURE OF INVENTION

Technical Problem

Propagation delays are significantly higher in NTN, even for the low Earth orbit (LEO) satellites at e.g. 600 km altitude, a one way propagation experiences a 2 ms delay. This makes the implementation of the default HARQ operations, difficult in NTN. Firstly, an application will experience significant delays and, even if the application is delay tolerant, there needs to be a large amount of data in the buffers, until the data packets can be cleared from buffering after positive ACKs. However, in certain propagation scenarios (like block fading discussed in more detail later), it is beneficial to have HARQ procedures, rather than certain other alternative link robustness schemes.

The technical subjects pursued in the disclosure may not be limited to the above mentioned technical subjects, and other technical subjects which are not mentioned may be clearly understood, through the following descriptions, by those skilled in the art of the disclosure.

Solution to Problem

According to the present disclosure there is provided an apparatus and method as set forth in the appended claims.

Other features of the present disclosure will be apparent from the dependent claims, and the description which follows.

According to an embodiment of the present disclosure, a method of operating a base station in a Non-terrestrial Network (NTN) telecommunication system, may comprise the steps of: the base station detecting a block fading condition in a communication channel; the base station determining an average Spectral Efficiency (SE) value and reporting this to a User Equipment (UE) in communication with the base station; and the base station allocating a Modulation Coding Scheme (MCS) and activating a pre-emptive HARQ operation wherein the pre-emptive HARQ operation comprises the steps of: the base station determining an average fade duration; and sending multiple copies of a given data packet separated by a time at least equal to the average fade duration, with an MCS level matching a signal level associated with a non-fading condition of the communication channel.

According to an embodiment of the present disclosure, a method of operating a User Equipment (UE) in a Non-terrestrial Network (NTN) telecommunication system, may comprise the steps of: the UE receiving from a base station an average Spectral Efficiency (SE), value; through RRC signaling; wherein if the UE receives data packets with higher MCS levels, corresponding to a higher level of SE than the RRC-signaled SE, then the UE implicitly determines a pre-emptive HARQ mode; and the UE receiving multiple copies of a given data packet, separated by a time at least equal to an average fade duration, determined by the base station.

According to an embodiment of the present disclosure, a base station may be arranged to perform the method according to an embodiment of the present disclosure.

According to an embodiment of the present disclosure, UE may be arranged to perform the method according to an embodiment of the present disclosure.

According to an embodiment of the present disclosure, telecommunication system may comprise the base station and the UE according to an embodiment of the present disclosure.

Advantageous Effects of Invention

The pre-emptive retransmission HARQ scheme according to an embodiment of the present disclosure described herein can overcome the impact of a binary, two state channel (caused by block fading) and also reduce the delays and signaling overhead, achieving good improvements in the data transmission quality. This will additionally make the radio link quality acceptable under difficult propagation conditions, associated with the two state channel.

A method and an apparatus according to an embodiment of the present disclosure may be used in fifth generation (5G) or new radio (NR) systems but may be used in other telecommunication systems.

Effects which can be acquired by the disclosure are not limited to the above described effects, and other effects that have not been mentioned may be clearly understood by those skilled in the art from the following description.

BRIEF DESCRIPTION OF DRAWINGS

For a better understanding of the disclosure, and to show how embodiments of the same may be carried into effect, reference will now be made, by way of example only, to the accompanying diagrammatic drawings in which:

FIG. 1 illustrates a wireless communication system according to an embodiment of the present disclosure;

FIG. 2 illustrates a base station in the wireless communication system according to an embodiment of the present disclosure;

FIG. 3 illustrates a terminal in the wireless communication system according to an embodiment of the present disclosure;

FIG. 4 illustrates a communication interface in the wireless communication system according to an embodiment of the present disclosure;

FIG. 5 shows an NTN implementation of the "bent-pipe" variety according to an embodiment of the present disclosure;

FIG. 6 shows a representation of block fading;

FIG. 7 shows a schematic representation of a pre-emptive HARQ scheme according to an embodiment of the present disclosure;

FIG. 8A shows a representation of block fading channel interpretation from observed SE values;

FIG. 8B shows a representation of block fading channel interpretation from observed SE values; and FIG. 9 shows a flow chart of a method according to an embodiment of the present disclosure.

BEST MODE FOR CARRYING OUT THE INVENTION

Hereinafter, in an embodiment of the present disclosure, hardware approaches will be described as an example. However, an embodiment of the present disclosure includes a technology that uses both hardware and software and thus, an embodiment of the present disclosure may not exclude the perspective of software.

Hereinafter, the present disclosure describes technology for automatic repeat request (HARQ or hybrid ARQ) in a non-terrestrial network (NTN) in a wireless communication system.

The terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes an embodiment based on the terms used in some communication standards (for example, 3rd Generation Partnership Project (3GPP)), they are only examples for the description. An embodiment of the present disclosure may be easily modified and applied to other communication systems.

FIG. 1 illustrates a wireless communication system according to an embodiment of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

FIG. 2 illustrates the BS in the wireless communication system according to an embodiment of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination thereof.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into a Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination thereof. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor.

According to exemplary embodiments of the present disclosure, the controller 240 may detect a block fading condition in a communication channel. According to exemplary embodiments of the present disclosure, the controller 240 may determine an average spectral efficiency (SE) value. According to exemplary embodiments of the present disclosure, the controller 240 may report the average SE value to a user equipment (UE) in communication with the base station. According to exemplary embodiments of the present disclosure, the controller 240 may allocate a modulation and coding scheme (MCS). According to exemplary embodiments of the present disclosure, the controller 240 may activate a pre-emptive HARQ operation. According to exemplary embodiments of the present disclosure, the controller 240 may determine an average fade duration and send multiple copies of a given data packet separated by a time at least equal to the average fade duration, with an MCS level matching a signal level associated with a non-fading condition of the communication channel for the pre-emptive HARQ operation. For example, the controller 240 may control the base station to perform operations according to the exemplary embodiments of the present disclosure.

FIG. 3 illustrates the terminal in the wireless communication system according to an embodiment of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination thereof.

Referring to FIG. 3, the terminal 120 includes a communication interface 310, a storage unit 320, and a controller 330. [49] The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination thereof. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

According to exemplary embodiments of the present disclosure, the controller 330 may receive from a base station an average SE value through RRC signaling. According to exemplary embodiments of the present disclosure, the controller 330 may implicitly determine a pre-emptive HARQ mode, if the UE receives data packets with higher MCS levels corresponding to a higher level of SE than the RRC-signaled SE. According to exemplary embodiments of the present disclosure, the controller 330 may receive multiple copies of a given data packet, separated by a time at least equal to an average fade duration, determined by the base station. For example, the controller 330 may control the terminal to perform operations according to the exemplary embodiments of the present disclosure.

FIG. 4 illustrates the communication interface in the wireless communication system according to an embodiment of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

According to an embodiment of the present disclosure, the base station may detect block fading based on a pattern of received ACK/NACK signals or based on received CQI values from the UE.

According to an embodiment of the present disclosure, the base station may transmit a number of multiple copies based on one or more of: fade depth and/or duration; resource consumption; and delay margins for an application in use.

According to an embodiment of the present disclosure, the base station may report the average Spectral Efficiency (SE) value via RRC signaling.

According to an embodiment of the present disclosure, the base station may repeat the pre-emptive HARQ operation until the block fading condition changes.

According to an embodiment of the present disclosure, the UE may implicitly determine the average fade duration, based on the relative levels of the average SE reported by the base station and a higher SE level indicated by the MCS (modulation and coding scheme) used by the base station.

According to an embodiment of the present disclosure, the UE may combine the multiple data packets, received with a gap greater than the identified average fade duration, to improve chances of proper reception.

According to an embodiment of the present disclosure, the UE may send either ACK or NACK only after combining the multiple data packets.

According to an embodiment of the present disclosure, the UE may send only ACK and not NACK.

An embodiment of the present disclosure may deal with the longer delays associated with satellite links and may identify certain use cases where HARQ procedures are still applicable. An embodiment of the present disclosure, shows that for certain block fading scenarios, the use of HARQ is more beneficial than the use of other techniques to increase the robustness of the data link, like the use of lower MCS tables.

To reduce the delays in effective packet transfer and signaling overhead, an embodiment of the present disclosure may include pre-emptive re-transmission techniques and reduced ACK/NACK responses. The transmitter (e.g., satellite) according to an embodiment of the present disclosure may obtain channel knowledge from the feedback transmissions of the user and may schedule pre-emptive re-transmission with a larger gap than the average fade duration and also consider the propagation delays associated with the transmission.

An embodiment of the present disclosure may adapt the HARQ procedure to suit the propagation delays in LEO and medium Earth orbit (MEO) satellite links. An embodiment of the present disclosure addresses a particular problem of block fading in satellite channels and allows HARQ to be used to mitigate the impact on the quality of received data. An embodiment of the invention may involve the step of estimating the average fade duration and positioning the first and the second transmission of a packet to be of a longer duration than this fade duration.

An embodiment of the present disclosure may also include a pre-emptive retransmission mode, which can be used to reduce the delays in successful completion of the packet reception. An embodiment of the present disclosure also details how the ACK/NACK responses can be sent after Chase combining the 2 transmissions, to reduce the signaling overhead. In Chase combining, every re-transmission contains the same information (data and parity bits). The receiver according to an embodiment of the present disclosure uses maximum-ratio combining to combine the received bits with the same bits from previous transmissions. According to an embodiment of the present disclosure, because all transmissions are identical, Chase combining can be considered as additional repetition coding.

FIG. 5 shows an NTN implementation of the "bent-pipe" variety according to an embodiment of the present disclosure. FIG. 6 shows a representation of block fading.

The HARQ process in 5G-NR specifies up to 16 consecutive transmissions (of 1 ms packets) so that the physical link can be kept occupied while the packets and ACK/NACK messages are processed and retransmissions made if needed. The propagation delay in the terrestrial links are negligible and a processing delay of 3 ms is considered in LTE.

In the NTN channels, the propagation delay is significant, with a LEO satellite at 600 km altitude showing a 2 ms delay for a single link (e.g., uplink, or downlink) and 4 ms delay for a bent pipe transmission, as shown in FIG. 5, where two ground stations 510, 520 are in communication with a satellite 530. A MEO satellite at 2100 km altitude may show 7 ms delay for a single link and 14 ms delay for a bent pipe link. Considering improved processing time for 5G-NR receivers at 2 ms, even a HARQ scheme with a single retransmission for the MEO bent pipe transmission can fit within a time frame of 32 ms. This would mean that the number of packets that need buffering has to increase to 32 from the current 16 in 5G-NR. However, this relatively modest increase can facilitate HARQ in both LEO and MEO satellite links and can address the block fading issue effectively.

A method and an apparatus according to an embodiment of the present disclosure are applicable in block fading conditions, with very fast relative motion of the satellite and the user on the ground. Such conditions, for example, can occur when LEO or MEO satellites (which moves relative to the earth) support a data link to a fast moving vehicle on a highway. The direct signal path can be intermittently blocked by shadowing due to certain cloud cover or vegetation patterns and this may drop the received signal strength by 10 dB or more. A measurement trace of a satellite channel, taken with a vehicle moving at 60 km/h and showing these block fading instances is depicted in FIG. 6.

Block fading is defined as the situation where the radio channel oscillates between a deep fade and a good channel (no fade) conditions, giving a binary pattern in the channel state.

The measurement represented in FIG. 6 was taken with a Geostationary (GEO) satellite signal. With the relative motion of the LEO/MEO satellites and with vehicle speeds up to 500 km/h, the fade durations can go down to the 10 ms of ms range. The impact of this fading is to create a two-state binary channel, which makes the adaptation of the modulation and coding scheme (MCS) to reflect the channel state very difficult and inefficient. In this situation, A method and an apparatus according to an embodiment of the present disclosure using a pre-emptive HARQ scheme can provide better performance.

The pre-emptive HARQ scheme becomes operational for LEO and/or MEO satellite links once a block fading situation has been detected by the transmitter. The detection can be based on a regular pattern of ACK/NACK instances under normal HARQ operation or the Channel Quality Indicator (CQI) values which the receiver constantly reports back. This enables the transmitter to establish an average fade duration, also considering the propagation time delays for the outward and feedback signals. The transmitter then indicates to the receiver that it will move to the pre-emptive HARQ mode. With this mode, the transmitter first sends a packet and re-sends this packet again after a period greater than the average fade duration, without waiting for an ACK/NACK signal. This gives a greater chance of at least one of the packets avoiding a fade such that the at least one packet can be received with a good Signal to Noise Ratio (SNR).

In an embodiment, the receiver can also opt to send the ACK or NACK feedback signal only after receiving the two transmissions and combining the two packets. This can be particularly useful if the propagation delays are high relative to the fade duration, and the transmitter would already have sent the second instance of the packet before the feedback signal reaching it.

In another variant, useful for shorter propagation delays, the receiver can only send the feedback if it is an ACK, and refrain from sending the NACK, so the transmitter automatically re-transmits after the lapse of the fade duration period.

FIG. 7 shows a schematic representation of a pre-emptive HARQ scheme according to an embodiment of the present disclosure. FIG. 8A shows a representation of block fading channel interpretation from observed SE values. FIG. 8B shows a representation of block fading channel interpretation from observed SE values.

A schematic timing diagram for this pre-emptive HARQ scheme with the limited feedback option is shown in FIG. 7. The propagation and processing times shown are only indicative as embodiments of the present disclosure are applicable to many variations of these values.

In FIG. 7, a packet P1 is transmitted as shown on the Tx timeline. P1 is received after a propagation time (3 ms) at the Receiver, as shown on the Rx timeline. After processing, the processed packet P1' is combined with a second version (P1") of the received and processed packet P1. The combined version is used to generate an ACK signal as shown.

As shown, since the HARQ retransmission occurs before the first ACK/NACK feedback can be received and processed, this scheme allows faster data transfer, at the cost of some retransmissions which can become redundant. Such a scheme helps to reduce the overall delay in packet delivery and is effective in countering the binary nature of the block fading channel.

The embodiments so far described allow for a single retransmission, but for LEO satellites with shorter delays, there can be multiple pre-emptive re-transmissions. In an adaptive scheme, the transmitter makes the decision on the number of re-transmissions, depending on the fade depth and duration, resource consumption and the expected delay margins for the application in question. The receiver can also opt to reduce the feedback rate further by delaying ACK/NACK transmission until all of the received packets are combined.

An embodiment of the present disclosure comprises the following steps:

1. The transmitter (ground station in a bent-pipe scenario, or satellite in the single link scenario) measures the average fade duration under block fading conditions, using the CQI feedback information from the receiver or the ACK/NACK pattern of the customary HARQ process. The transmitter is aware of the propagation delays and will also use this information to derive the fade durations.

2. The transmitter adapts the pre-emptive HARQ mode (and signal to inform the receiver), where the re-transmission is spaced at a time gap greater than the average fade duration yet still contained to receive the combined packet feedback within the number of frames buffered (32 as mentioned previously or any other configured number, as required).

3. Within this pre-emptive HARQ mode, the receiver will only send the feedback after combining the two (or more, as specified in the configuration) pre-emptive transmissions, to increase the chances of sending an ACK and to reduce the signaling overhead.

4. The transmitter will move onto a new packet (for an ACK) or repeat the same packet (for a NACK) and execute the pre-emptive transmissions (i.e. repeat steps 2, 3, 4 above).

This pre-emptive HARQ solution is useful only under certain channel conditions, i.e. when block fading is detected in the channel. Block fading is where the fading process is approximately constant for a number of symbol intervals.

In all modes of operation, the UE will continue to report back the CQI and the requested MCS to the Base Station (gNB). If the gNB detects a block pattern of good CQI and poor CQI in the reports, and if the average oscillation period falls within a specified number of parallel HARQ processes, then the gNB will decide to activate the pre-emptive HARQ procedure. This is implicitly reported back to the UE as follows.

Up until the gNB detects the block fading channel behavior, the gNB will try to match the MCS request from the UE, reporting the expected spectral efficiency in the RRC signaling and allocating the MCS levels as slightly above this level (to implicitly indicate HARQ enabling) or slightly below this level (to implicitly indicate HARQ disabling). When the block fading, binary channel condition is detected, the gNB selects an average spectral efficiency (SE) level corresponding to the 'duty cycle' of good CQI and poor CQI reports and reports this back to the UE in RRC signaling. Spectral efficiency is the information rate that can be transmitted over a given bandwidth in a specific communication system. It is a measure of how efficiently a limited frequency spectrum is utilized by the physical layer protocol With the pre-emptive HARQ mode enabled, the gNB will start to transmit with MCS related to the good channel condition, regardless of the binary channel variations. The UE detects the MCS level from the DCI and observes that channel CQI will sometimes match the MCS level, but when the channel condition is poor, the CQI observed MCS is below the DCI indicated MCS. This pattern will inform the UE that pre-emptive HARQ has been activated.

To determine the packet repetition rate in the pre-emptive HARQ process, the UE utilizes the high SE level observed by reading the high MCS allocation (in reading the DCI) and the RRC indicated average SE level. With the estimated signal strengths for these two SE levels, the UE is able to calculate the average fade duration, as estimated by the gNB. The UE will have its own CQI reporting pattern, and this will match closely with the above estimated pattern, as seen by the gNB. It is important to detect the estimated pattern as seen by the gNB, as the HARQ repetition is based on this estimation. Two example signal levels are shown in FIGS. 8A and 8B, to show how the corresponding reported SE levels (one through MCS in DCI and the other in RRC) map to the fade duration.

Once the UE interprets the fade duration, it will look for the repetition of the packet after a time gap which exceeds the fade duration. It will only send the ACK/NACK after combining and CRC decoding two or more instances of the packet, as indicated by the pre-emptive HARQ scheme.

FIG. 9 shows a flow chart of a method according to an embodiment of the present disclosure. The flowchart of FIG. 9 depicts the steps involved in the signaling mechanism for the implicit indication of the pre-emptive HARQ solution.

At step 910, the NTN gNB (satellite) detects block fading conditions via the CQI reports which are received from the UE on the ground.

At step 920, the NTN gNB reports the average SE value via RRC signaling to the UE.

At step 930, the NTN gNB continuously allocates MCS to match the good channel condition and also activates the pre-emptive HARQ scheme.

At step 940, the UE detects a high MCS SE (above the average RRC-indicated SE) and so identifies that pre-emptive HARQ is in operation.

At step 950, the UE determines the average fade duration from the ratio of received MCS SE to the reported RRC average SE.

At step 960, the UE looks for the repeated packet(s) after the calculated average fade length, combines these packets and sends ACK or NACK (as appropriate) to the gNB.

Finally, at step 970, the gNB repeats the pre-emptive HARQ process until the block fading condition in the channel changes. If it does not, then flow returns to 910.

According to an embodiment of the present disclosure, a method of operating a base station in a non-terrestrial network (NTN) telecommunication system, may comprise the steps of: the base station detecting a block fading condition in a communication channel; the base station determining an average spectral efficiency (SE) value and reporting this to a user equipment (UE) in communication with the base station; and the base station allocating a modulation and coding scheme (MCS) and activating a pre-emptive HARQ operation wherein the pre-emptive HARQ operation comprises the steps of: the base station determining an average fade duration; and sending multiple copies of a given data packet separated by a time at least equal to the average fade duration, with an MCS level matching a signal level associated with a non-fading condition of the communication channel.

According to an embodiment of the present disclosure, the base station may detect block fading on the basis of a pattern of received ACK/NACK signals or on the basis of received CQI values from the UE.

According to an embodiment of the present disclosure, the base station may transmit a number of multiple copies on basis of one or more of: fade depth and/or duration; resource consumption; and delay margins for an application in use.

According to an embodiment of the present disclosure, the base station may report the average spectral efficiency (SE) value via RRC signaling.

According to an embodiment of the present disclosure, the base station may repeat the pre-emptive HARQ operation until the block fading condition changes.

According to an embodiment of the present disclosure, a method of operating a user equipment (UE) in a non-terrestrial network (NTN) telecommunication system, may comprise the steps of: the UE receiving from a base station an average spectral efficiency (SE) value; through RRC signaling; wherein if the UE receives data packets with higher MCS levels, corresponding to a higher level of SE than the RRC-signaled SE, then the UE implicitly determines a pre-emptive HARQ mode; and the UE receiving multiple copies of a given data packet, separated by a time at least equal to an average fade duration, determined by the base station.

According to an embodiment of the present disclosure, the UE may implicitly determine the average fade duration, based on the relative levels of the average SE reported by the base station and a higher SE level indicated by the MCS used by the base station.

According to an embodiment of the present disclosure, the UE may combine the multiple data packets, received with a gap greater than the identified average fade duration, to improve chances of proper reception.

According to an embodiment of the present disclosure, the UE may send either ACK or NACK only after combining the multiple data packets.

According to an embodiment of the present disclosure, the UE may send only ACK and not NACK.

According to an embodiment of the present disclosure, a base station may be arranged to perform a method according to an embodiment of the present disclosure.

According to an embodiment of the present disclosure, a UE may be arranged to perform a method according to an embodiment of the present disclosure.

According to an embodiment of the present disclosure, a telecommunication system may comprise the base station and the UE according to an embodiment of the present disclosure.

It is implied that once block fading conditions change, the reported RRC SE and the MCS indicated SE will change, and the UE will interpret this accordingly to move onto normal HARQ enabled or HARQ disabled modes.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The present disclosure is not restricted to the details of the foregoing embodiment(s). The present disclosure extends to any novel one, or any novel combination, of the features disclosed in this specification (including any accompanying claims, abstract and drawings), or to any novel one, or any novel combination, of the steps of any method or process so disclosed.

Methods according to embodiments stated in claims and/or specifications of the present disclosure may be implemented in hardware, software, or a combination thereof.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to an embodiment of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and an embodiment of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method performed by a base station in a wireless communication system, the method comprising:
   identifying an average fade duration of a block fade based on a pattern of a hybrid automatic repeat request acknowledgment (HARQ-ACK) received from a user equipment (UE) via a physical uplink control channel (PUCCH); and
   in response to identifying the average fade duration of the block fade:
      identifying a number of re-transmissions based on the average fade duration, wherein the re-transmissions are spaced at a time interval greater than the average fade duration,
      transmitting, to the UE, an average spectral efficiency (SE) level corresponding to a duty cycle of UE channel quality indicator (CQI) reporting via radio resource control (RRC) signaling,
      transmitting, to the UE, downlink control information (DCI) allocating a modulation and coding scheme (MCS) level according to a channel state in which a fade does not exist, wherein the DCI indicates that data is repeatedly transmitted, and
      repeatedly transmitting, to the UE, data by using at least two symbols that have the time interval,
   wherein the average fade duration is indicated to the UE based on a ratio of a SE level associated with the MCS level and the average SE level transmitted to the UE.

2. The method of claim 1, wherein the block fade is a channel state in which a first period in which fade exists and a second period in which fade does not exist alternate.

3. The method of claim 1, wherein the number of the re-transmissions is further based on fade depth of the block fade.

4. The method of claim 1, further comprising:
   receiving, from the UE, a HARQ-ACK with regard to the repeatedly transmitted data.

5. A method performed by a user equipment (UE) in a wireless communication system, the method comprising:
   transmitting, to a base station, a plurality of hybrid automatic repeat request acknowledgement (HARQ-ACK) messages via a physical uplink control channel (PUCCH);
   receiving, from the base station, a signal identifying a block fade based on a pattern of the HARQ-ACK messages;
   receiving, from the base station, an average spectral efficiency (SE) level corresponding to a duty cycle of UE channel quality indicator (CQI) reporting via radio resource control (RRC) signaling;
   receiving, from the base station, downlink control information (DCI) allocating a modulation and coding scheme (MCS) level according to a channel state in which a fade does not exist;
   identifying re-transmissions of data based on the MCS level;
   identifying an average fade duration based on a ratio of a SE level associated with the MCS level and the average SE level, wherein a number of the re-transmissions is based on the average fade duration, wherein the re-transmissions are spaced at a time interval greater than the average fade duration; and
   repeatedly receiving, from the base station, data by using at least two symbols that have the time interval.

6. A base station in a wireless communication system, the base station comprising:
   a transceiver; and
   at least one processor coupled with the transceiver and configured to:
      identify an average fade duration of a block fade based on a pattern of a hybrid automatic repeat request acknowledgment (HARQ-ACK) received from a user equipment (UE) via a physical uplink control channel (PUCCH), and
      in response to identifying the average fade duration of the block fade:
         identify a number of re-transmissions based on an average fade duration, wherein the re-transmissions are spaced at a time interval greater than the average fade duration,
         transmit, to the UE, an average spectral efficiency (SE) level corresponding to a duty cycle of UE channel quality indicator (CQI) reporting via radio resource control (RRC) signaling,
         transmit, to the UE, downlink control information (DCI) allocated allocating a modulation and coding scheme (MCS) level according to a channel state in which a fade does not exist, wherein the DCI indicates that data is repeatedly transmitted, and
         repeatedly transmit, to the UE, data by using at least two symbols that have the time interval,
      wherein the average fade duration is indicated to the UE based on a ratio of a SE level associated with the MCS level and the average SE level transmitted to the UE.

7. The base station of claim 6, wherein the block fade is a channel state in which a first period in which fade exists and a second period in which fade does not exist alternate.

* * * * *